(12) United States Patent
Kermiche et al.

(10) Patent No.: US 8,582,231 B1
(45) Date of Patent: Nov. 12, 2013

(54) DISK DRIVE DETERMINING HEAD TOUCHDOWN THRESHOLD BASED ON CURVE FITTING PREDICTION ERROR

(75) Inventors: Noureddine Kermiche, Dana Point, CA (US); Xianghui Xiao, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 15 days.

(21) Appl. No.: 13/490,317

(22) Filed: Jun. 6, 2012

(51) Int. Cl.
*G11B 21/02* (2006.01)
*G11B 27/36* (2006.01)

(52) U.S. Cl.
USPC .............................................. 360/75; 360/31

(58) Field of Classification Search
None
See application file for complete search history.

(56) References Cited

U.S. PATENT DOCUMENTS

| | | | |
|---|---|---|---|
| 6,097,559 A | 8/2000 | Ottesen et al. | |
| 6,288,856 B1 | 9/2001 | Ottesen et al. | |
| 6,293,135 B1 | 9/2001 | Marchon et al. | |
| 6,417,981 B1 | 7/2002 | Smith | |
| 6,674,590 B2 | 1/2004 | Ottesen et al. | |
| 6,700,724 B2 | 3/2004 | Riddering et al. | |
| 6,717,764 B2 | 4/2004 | Lake | |
| 6,785,081 B2 | 8/2004 | Chapin et al. | |
| 7,180,692 B1 | 2/2007 | Che et al. | |
| 7,199,961 B1 | 4/2007 | Wu et al. | |
| 7,292,401 B2 | 11/2007 | Shen et al. | |
| 7,359,139 B1 | 4/2008 | Wu et al. | |
| 7,394,611 B1 | 7/2008 | Rahgozar | |
| 7,405,896 B2 | 7/2008 | Hirano et al. | |
| 7,423,830 B2 | 9/2008 | Ma et al. | |
| 7,440,220 B1 | 10/2008 | Kang et al. | |
| 7,583,466 B2 | 9/2009 | Kermiche et al. | |
| 7,616,398 B2 | 11/2009 | Gong et al. | |
| 7,656,600 B2 | 2/2010 | Dakroub et al. | |
| 7,679,857 B2 * | 3/2010 | Zhu et al. | 360/75 |
| 7,796,356 B1 | 9/2010 | Fowler et al. | |
| 8,059,357 B1 | 11/2011 | Knigge et al. | |
| 8,085,490 B2 | 12/2011 | Franca-Neto et al. | |
| 8,098,450 B2 | 1/2012 | Baumgart et al. | |
| 2002/0054446 A1 * | 5/2002 | Smith | 360/73.03 |
| 2006/0132961 A1 | 6/2006 | Ma | |
| 2007/0291401 A1 | 12/2007 | Sun et al. | |
| 2008/0278835 A1 | 11/2008 | Dakroub et al. | |
| 2009/0128947 A1 * | 5/2009 | Kermiche et al. | 360/75 |
| 2011/0157736 A1 | 6/2011 | Contreras et al. | |
| 2011/0157740 A1 | 6/2011 | Baumgart et al. | |
| 2012/0212851 A1 * | 8/2012 | Goldberg et al. | 360/46 |

* cited by examiner

*Primary Examiner* — Andrew L Sniezek

(57) ABSTRACT

A disk drive is disclosed comprising a head actuated over a disk. An analog touchdown (TD) signal is compared to a TD threshold in order to generate a calibrated TD threshold for a plurality of different dynamic fly height (DFH) settings. The calibrated TD thresholds and corresponding DFH settings are fitted to an estimated curve. At least one of the TD threshold and the DFH setting is adjusted, and a corresponding next point in the estimated curve is predicted. An actual next point corresponding to the adjustment is determined, and a prediction error is generated based on a difference between the predicted next point and the actual next point. A touchdown of the head on the disk is detected when the prediction error exceeds a prediction threshold.

20 Claims, 6 Drawing Sheets

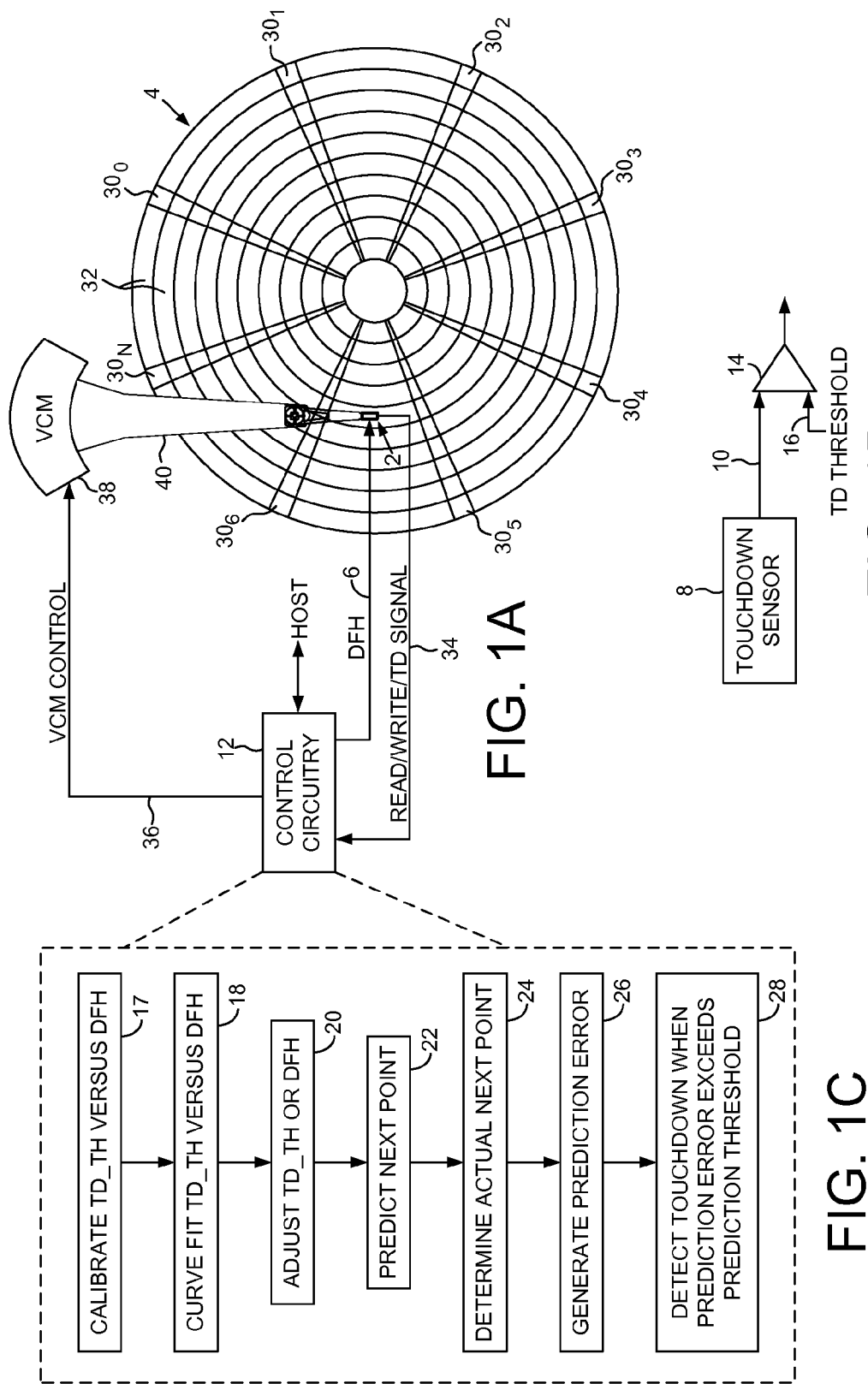

DISK DRIVE DETERMINING HEAD TOUCHDOWN THRESHOLD BASED ON CURVE FITTING PREDICTION ERROR

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

BRIEF DESCRIPTION OF THE DRAWINGS

FIG. 1A shows a disk drive according to an embodiment of the present invention comprising a head actuated over a disk.

FIG. 1B shows a touchdown (TD) sensor for generating an analog TD signal that is compared to a TD threshold according to an embodiment of the present invention.

FIG. 1C is a flow diagram according to an embodiment of the present invention for detecting when the head touches down on the disk based on a curve fitting prediction error.

DETAILED DESCRIPTION

Figure 1D:
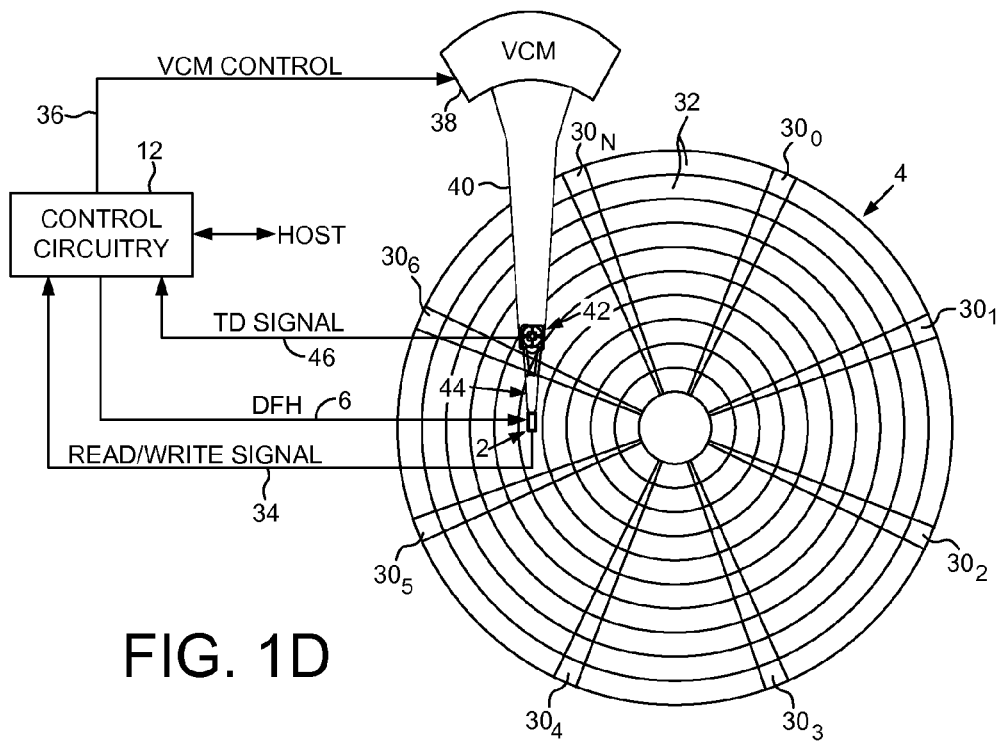
FIG. 1D shows an embodiment of the present invention wherein the TD sensor comprises a microactuator for actuating the head over the disk.

FIG. 1A shows a disk drive according to an embodiment of the present invention comprising a head 2 actuated over a disk 4, a dynamic fly height (DFH) actuator operable to control a fly height of the head 2 over the disk 4 in response to a DFH setting 6, and a touchdown (TD) sensor 8 (FIG. 1B) operable to generate an analog TD signal 10. The disk drive further comprises control circuitry 12 operable to execute the flow diagram of FIG. 1C, wherein the analog TD signal 10 is compared 14 to a TD threshold 16 in order to generate a calibrated TD threshold for a plurality of different DFH settings (block 17). The calibrated TD thresholds and corresponding DFH settings are fit to an estimated curve (block 18). At least one of the TD threshold and the DFH setting are adjusted (block 20), and a corresponding next point in the estimated curve is predicted (block 22). An actual next point corresponding to the adjustment is determined (block 24), and a prediction error based on a difference between the predicted next point and the actual next point is generated (block 26). A touchdown of the head on the disk is detected when the prediction error exceeds a prediction threshold (block 28).

In the embodiment of FIG. 1A, the disk 4 comprises embedded servo sectors $30_0$-$30_N$ that define a plurality of tracks 32. The control circuitry 12 processes a read signal 34 emanating from the head 2 to demodulate the servo sectors $30_0$-$30_N$ and generate a position error signal (PES) representing an error between the actual position of the head and a target position relative to a target track. The control circuitry 12 filters the PES using a suitable compensation filter to generate a control signal 36 applied to a voice coil motor (VCM) 38 which rotates an actuator arm 40 about a pivot in order to actuate the head 2 radially over the disk in a direction that reduces the PES. The servo sectors $30_0$-$30_N$ may comprise any suitable position information, such as a track address for coarse positioning and servo bursts for fine positioning. The servo bursts may comprise any suitable pattern, such as the amplitude-based servo pattern (e.g., a quadrature servo pattern), or a suitable phase-based servo pattern.

The DFH actuator may be implemented in any suitable manner, such as a heater integrated with the head 2 which controls the fly height through thermal expansion. Alternatively, the DFH actuator may comprise a piezoelectric (PZT) actuator which deflects when excited by a suitable control signal (e.g., a suitable voltage). In one embodiment, the touchdown sensor 8 may also be integrated into the head 2, such as fabricating the head 2 with a suitable magnetoresistive (MR) sensor or a suitable tunneling sensor. The TD sensor 8 may comprise a resistance that varies relative to the fly height of the head, and therefore generates the TD signal 10 as a voltage or current that reflects the change in the resistance. In one embodiment, the TD sensor may comprise the read element in the head 2, such as in the embodiment where the TD sensor comprises a MR sensor, and therefore the TD signal 10 may comprise the read signal 34 emanating from the read element. In another embodiment, the TD sensor 10 may be a separate component fabricated within the head 2 that generates a dedicated TD signal 10 separate from the read signal 34.

Figure 1E:
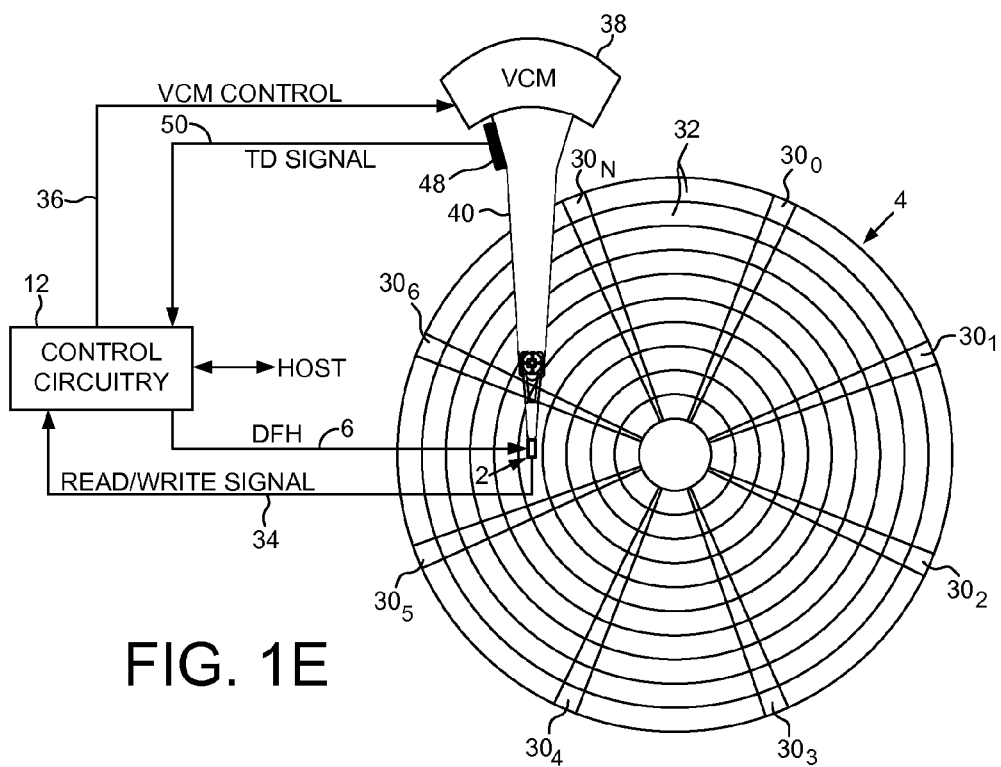
FIG. 1E shows an embodiment of the present invention wherein the TD sensor comprising a piezoelectric (PZT) sensor mounted on the actuator arm.

FIG. 1D shows an alternative embodiment of the present invention wherein the TD sensor 8 (FIG. 1B) may comprise a microactuator 42 that couples a suspension 44 to the actuator arm 40, wherein the head 2 is coupled to a distal end of the suspension 44. The microactuator 42 may comprise any suitable actuating element, such as a PZT element that rotates the suspension 44 about a pivot relative to the actuator arm 40 in order to actuate the head 2 over the disk 4 in fine movements. When detecting the head touchdown event, the microactuator 42 may be configured as a sensor that generates a TD signal 46 processed by the control circuitry 12. As the DFH setting 6 increases causing the head 2 to deflect toward the disk 4, there is a corresponding perturbation in the microactuator 42 reflected in the TD signal 46. FIG. 1E shows yet another embodiment wherein the TD sensor 8 (FIG. 1B) may comprise a suitable sensor 48 (e.g., a PZT sensor) mounted at any suitable location on the actuator arm 40. The TD sensor 48 generates a TD signal 50 as the DFH setting 6 increases and the head 2 approaches and eventually contacts the disk 4.

Figure 1F:
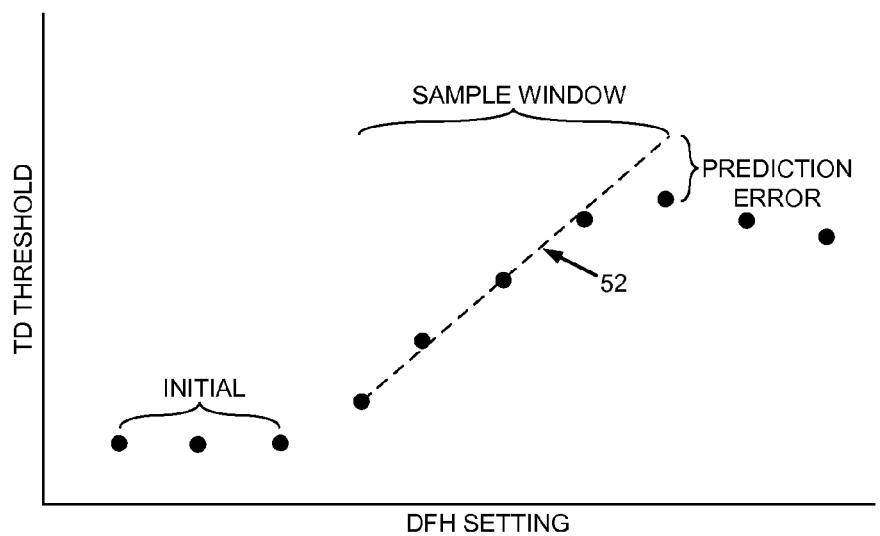
FIG. 1F is a graph of the TD signal versus the DFH settings fitted to an estimated curve, and a prediction error exceeding a threshold when a touchdown event occurs according to an embodiment of the present invention.

Regardless as to the type of TD sensor 8 employed, there may be ambiguity in the amplitude of the TD signal 10 (FIG. 1B) that corresponds to a head touchdown event. In one embodiment, this ambiguity is reduced significantly by evaluating when a prediction error of a curve fitting algorithm exceeds a threshold. This embodiment is illustrated in FIG. 1F wherein the amplitude of the TD signal 10 (as determined by the TD threshold 16) verses the DFH setting is fitted to an estimated curve. As the head 2 approaches the disk 4, the curve will take a particular shape (e.g., a linear curve 52 as shown in FIG. 1F). When a touchdown event occurs, the relationship between the TD signal versus the DFH setting will deviate as illustrated in FIG. 1F. This deviation is represented as a prediction error between a predicted next point in the estimated curve (after adjusting the DFH setting) and an actual point generated by measuring the TD signal. A touchdown event is detected when the prediction error exceeds a prediction threshold.

Figure 2A:
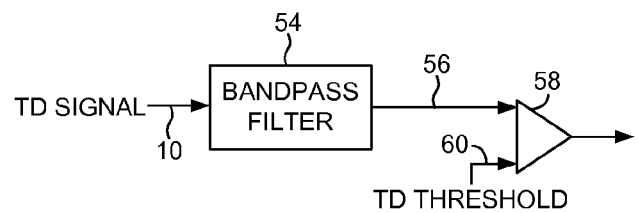
FIG. 2A shows an embodiment of the present invention wherein the TD signal is filtered using a bandpass filter before being compared to the TD threshold.
Figure 2B:
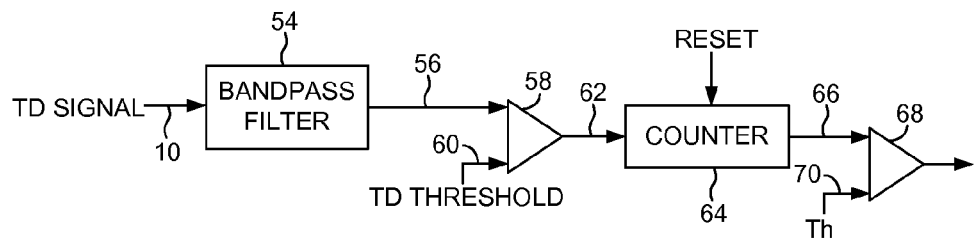
FIG. 2B shows an embodiment of the present invention wherein a counter counts a number of times the TD signal exceeds the TD threshold over a predetermined interval.

In some embodiments, it may not be possible to sample the TD signal 10 using an analog-to-digital converter due, for example, to a high frequency of the TD signal 10. For example, in one embodiment the TD sensor may be biased with a high frequency signal, such as biasing a MR sensor with a high frequency current. FIG. 2A shows an embodiment of the present invention wherein the resulting high frequency TD signal 10 is filtered by a bandpass filter 54, and the filtered signal 56 compared 58 to a TD threshold 60. FIG. 2B shows another embodiment of the present invention wherein the result of the comparison 62 is used to clock a counter 64 over a predetermined interval (after which the counter 64 is reset). At the end of the predetermined interval, the output 66 of the counter 64 is compared 68 to a threshold 70. Adjusting either or both of the thresholds 60 or 70 until the output 66 of the counter 64 exceeds the threshold 70 effectively implements an analog-to-digital conversion of the TD signal 10.

Figure 3:
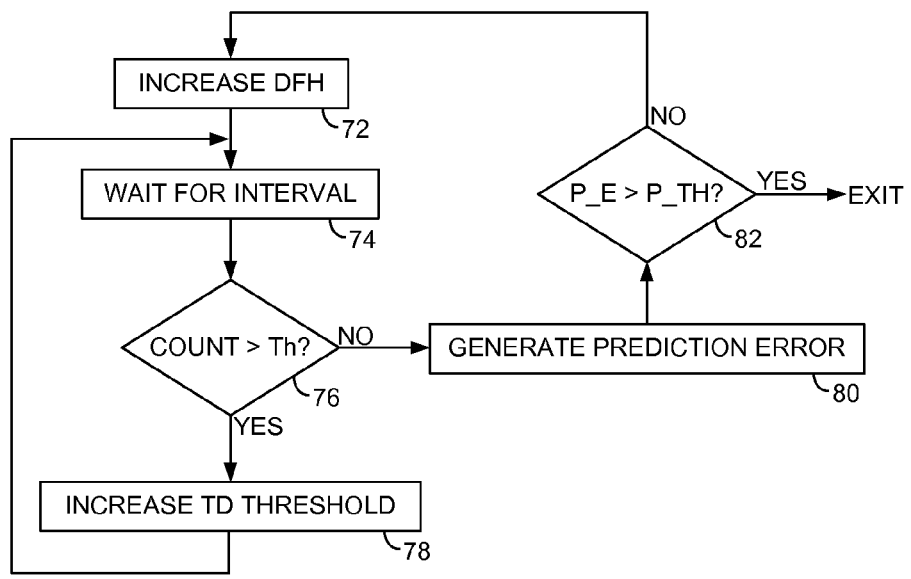
FIG. 3 is a flow diagram according to an embodiment of the present invention wherein a DFH setting is increased until the prediction error in the curve fitting algorithm exceeds a threshold.

FIG. 3 is a flow diagram according to an embodiment of the present invention for calibrating the TD threshold that corresponds to a head touchdown event. Once the TD threshold is calibrated, the DFH setting that corresponds to a head touchdown event can be periodically calibrated by increasing the DFH setting until the TD signal exceeds the operating TD threshold. Referring to FIG. 3, after initializing the DFH setting to a low value (corresponding to a high fly height) and initializing the TD threshold 60 (FIG. 2B) to a low value, the DFH setting is incrementally increased (block 72). When the predetermined interval expires (block 74), the output 66 of the counter 64 (FIG. 2B) is compared 68 to the threshold 70. If the counter output 66 exceeds the threshold 70 (block 76), then the counter 64 is reset and the TD threshold 60 is incrementally increased (block 78). The flow diagram is then repeated from block 74 until the TD threshold 60 increases to a level that results in the counter output 66 not exceeding the threshold 70 at block 76. The next point in the graph of FIG. 1F is then generated (TD threshold versus DFH setting), and a prediction error generated based on a difference between the predicted next point and the actual next point (block 80). If the prediction error does not exceed the prediction threshold (block 82), then the DFH setting is incrementally increased (block 72) and the flow diagram is repeated until the prediction error exceeds the prediction threshold at block 82. That is, the points in the graph of FIG. 1F are generated for each incremental increase in the DFH setting until the prediction error exceeds the prediction threshold. The TD threshold 60 that corresponds to the prediction error exceeding the prediction threshold is selected as the operating TD threshold 60 for detecting the head touchdown event during normal operation.

Figure 4:
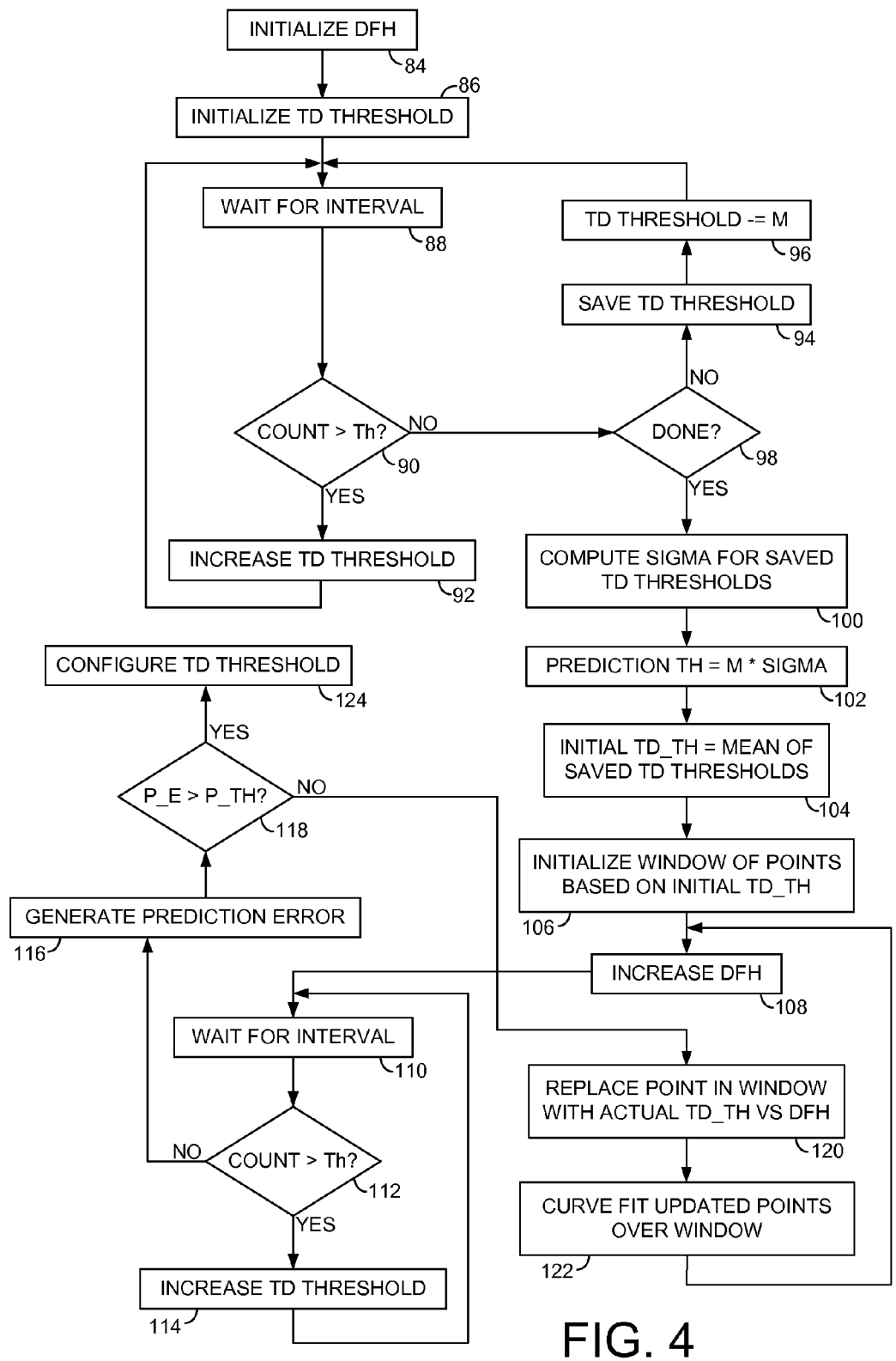
FIG. 4 is a flow diagram according to an embodiment of the present invention wherein the prediction threshold is initialized based on a standard deviation of an initial TD threshold.

FIG. 4 is a flow diagram according to an embodiment of the present invention for initializing the prediction threshold, wherein the DFH setting is first initialized to a value that corresponds to a high fly height for the head (block 84). The TD threshold 60 (FIG. 2B) is initialized to a low value (block 86), and after waiting the predetermined interval (block 88), the counter output is evaluated (block 90). If the counter output exceeds the threshold 70 (block 90), the TD threshold 60 is increased (block 92) and the flow diagram is repeated from block 88 until the counter output does not exceed the threshold 70. When the counter output does not exceed the threshold 70 at block 90, the current TD threshold 60 is saved (block 94) and the TD threshold 60 is decreased by a predetermined delta (block 96). The flow diagram is then repeated from block 88 until a sufficient number of initial TD thresholds 60 (block 98) have been calibrated and saved at block 94.

A standard deviation (sigma) for the saved TD thresholds 60 is then computed (block 100), and the prediction threshold is initialized (block 102) based on the standard deviation and the delta used at block 96. An initial TD threshold is generated as the mean of the saved TD thresholds (block 104), and a window of points in the graph of FIG. 1F is initialized with the initial TD threshold (block 106). The DFH setting is increased incrementally (block 108), and after waiting the predetermined interval (block 110), the counter output 66 is evaluated (block 112). If the counter output 66 exceeds the threshold 70, the TD threshold is increased (block 114) and the flow diagram is repeated from block 110 until the counter output 66 does not exceed the threshold 70 at block 112. When the counter output 66 does not exceed the threshold 70, a prediction error is generated (block 116) as a difference between a predicted next point in the estimated curve of FIG. 1F (over the window of points) and an actual next point based the current TD threshold and the current DFH setting. If the prediction error is less than the prediction threshold (block 118), then the oldest point in the window of points is shifted out and the next actual point versus the DFH setting is inserted into the window of points (block 120). The estimated curve is then updated over the updated window of points (block 122) and the flow diagram is repeated starting at block 108. When the prediction error exceeds the prediction threshold at block 118, an operating TD threshold is configured (block 124), for example, by decreasing the last TD threshold by a predetermined delta.

Figure 5A:
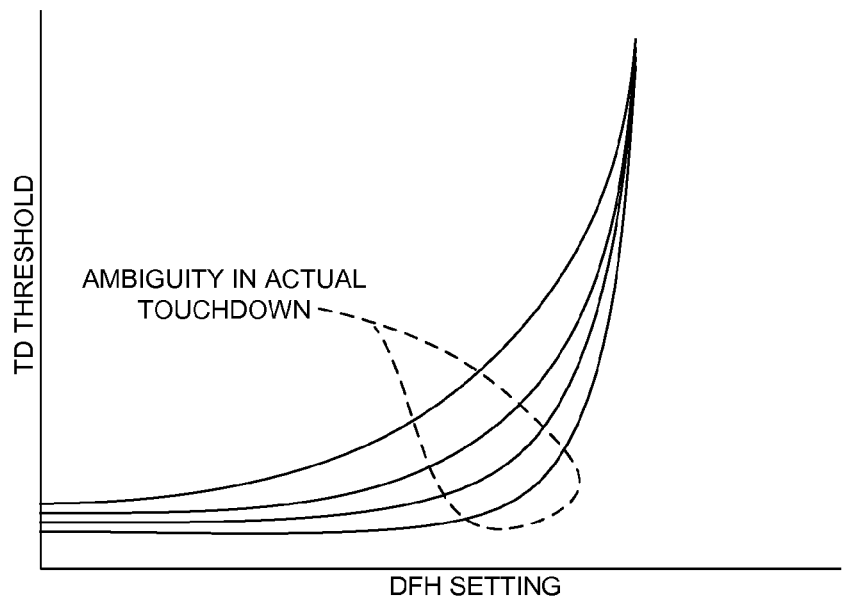
FIG. 5A illustrates an ambiguity in the TD signal relative to the DFH setting as to when the head touchdown event actually occurs.
Figure 5B:
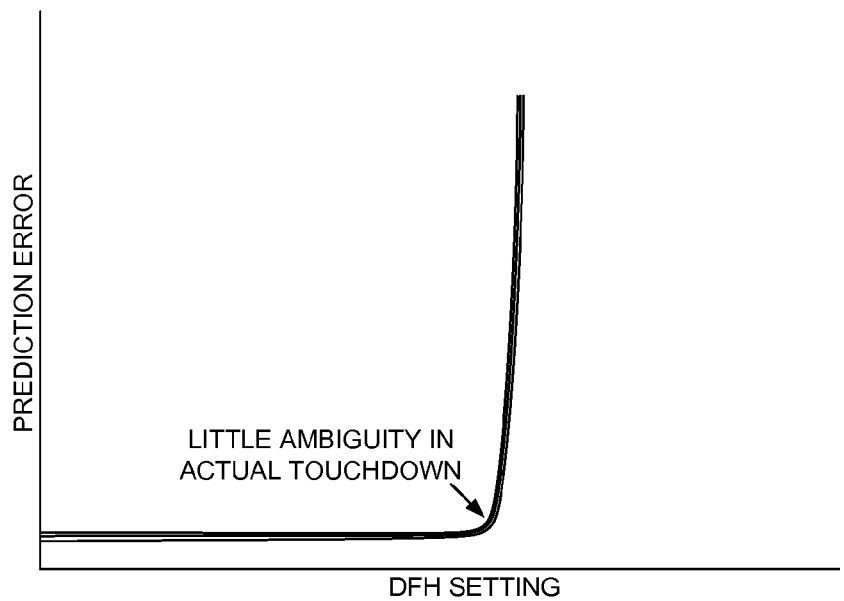
FIG. 5B illustrates how in the embodiments of the present invention the ambiguity of the head touchdown event is significantly reduced.

FIG. 5A shows graphs of the TD threshold versus the DFH setting for a plurality of different disk drives, wherein the graphs vary due to different characteristics of the TD sensors, such as a different sensitivity between the disk drives. The slow bending curves shown in FIG. 4A leads to ambiguity in detecting an actual touchdown event, and therefore leads to a suboptimal selection for the operating TD threshold. FIG. 5B illustrates how evaluating the prediction error versus the DFH setting as described above with reference to FIG. 1F significantly decrease the ambiguity in detecting the touchdown event across the plurality of different disk drives, thereby leading to a more optimal selection for the operating TD threshold.

Any suitable control circuitry may be employed to implement the flow diagrams in the embodiments of the present invention, such as any suitable integrated circuit or circuits.

For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk;
   a dynamic fly height (DFH) actuator operable to control a fly height of the head over the disk in response to a DFH setting;
   a touchdown (TD) sensor operable to generate an analog TD signal; and
   control circuitry operable to:
      compare the analog TD signal to a TD threshold in order to generate a calibrated TD threshold for a plurality of different DFH settings;
      curve fit the calibrated TD thresholds and corresponding DFH settings to an estimated curve;
      adjust at least one of the TD threshold and the DFH setting and predict a corresponding next point in the estimated curve;
      determine an actual next point corresponding to the adjustment;
      generate a prediction error based on a difference between the predicted next point and the actual next point; and
      detect a touchdown of the head on the disk when the prediction error exceeds a prediction threshold.

2. The disk drive as recited in claim 1, wherein the control circuitry is further operable to generate the calibrated TD threshold for a corresponding DFH setting by:
   counting a number of times the analog TD signal exceeds the TD threshold over a predetermined window; and
   determining the calibrated TD threshold for the corresponding DFH setting in response to the count.

3. The disk drive as recited in claim 2, wherein the control circuitry is further operable to generate the actual next point by adjusting at least one of the TD threshold and the DFH setting until the count reaches a target value.

4. The disk drive as recited in claim 2, wherein the control circuitry is further operable to generate an initial TD threshold based on a plurality of TD thresholds measured for an initial DFH setting that causes a high fly height for the head.

5. The disk drive as recited in claim 4, wherein the control circuitry is further operable to select the prediction threshold based on the plurality of TD thresholds measured for the initial DFH setting.

6. The disk drive as recited in claim 5, wherein the control circuitry is further operable to select the prediction threshold based on a standard deviation of the plurality of TD thresholds measured for the initial DFH setting.

7. The disk drive as recited in claim 4, wherein the control circuitry is further operable to initialize the estimated curve based on the initial TD threshold.

8. The disk drive as recited in claim 7, wherein the initial TD threshold comprises a mean of the plurality of TD thresholds measured for the initial DFH setting.

9. The disk drive as recited in claim 7, wherein the control circuitry is further operable to:
   initialize the estimated curve by initializing a window of points based on the initial TD threshold and the initial DFH setting; and
   replace points in the window over time with the actual next points.

10. The disk drive as recited in claim 9, wherein the control circuitry is further operable to update the estimated curve based on the replaced points in the window.

11. A method of operating a disk drive, the disk drive comprising a head actuated over a disk, a dynamic fly height (DFH) actuator operable to control a fly height of the head over the disk in response to a DFH setting, and a touchdown (TD) sensor operable to generate an analog TD signal, the method comprising:
   comparing the analog TD signal to a TD threshold in order to generate a calibrated TD threshold for a plurality of different DFH settings;
   curve fitting the calibrated TD thresholds and corresponding DFH settings to an estimated curve;
   adjusting at least one of the TD threshold and the DFH setting and predict a corresponding next point in the estimated curve;
   determining an actual next point corresponding to the adjustment;
   generating a prediction error based on a difference between the predicted next point and the actual next point; and
   detecting a touchdown of the head on the disk when the prediction error exceeds a prediction threshold.

12. The method as recited in claim 11, further comprising generating the calibrated TD threshold for a corresponding DFH setting by:
   counting a number of times the analog TD signal exceeds the TD threshold over a predetermined window; and
   determining the calibrated TD threshold for the corresponding DFH setting in response to the count.

13. The method as recited in claim 12, further comprising generating the actual next point by adjusting at least one of the TD threshold and the DFH setting until the count reaches a target value.

14. The method as recited in claim 12, further comprising generating an initial TD threshold based on a plurality of TD thresholds measured for an initial DFH setting that causes a high fly height for the head.

15. The method as recited in claim 14, further comprising selecting the prediction threshold based on the plurality of TD thresholds measured for the initial DFH setting.

16. The method as recited in claim 15, further comprising selecting the prediction threshold based on a standard deviation of the plurality of TD thresholds measured for the initial DFH setting.

17. The method as recited in claim 14, further comprising initializing the estimated curve based on the initial TD threshold.

18. The method as recited in claim 17, wherein the initial TD threshold comprises a mean of the plurality of TD thresholds measured for the initial DFH setting.

19. The method as recited in claim 17, further comprising:
   initializing the estimated curve by initializing a window of points based on the initial TD threshold and the initial DFH setting; and
   replacing points in the window over time with the actual next points.

20. The method as recited in claim 19, further comprising updating the estimated curve based on the replaced points in the window.

* * * * *